J. H. Manny.

Mower.

№ 354

Reissued Feb. 19, 1856.

UNITED STATES PATENT OFFICE.

JOHN H. MANNY, OF ROCKFORD, ILLINOIS, ASSIGNOR TO P. H. WATSON.

IMPROVEMENT IN HARVESTING-MACHINES.

Specification forming part of Letters Patent No. 11,810, dated October 17, 1854; antedated June 15, 1854; Reissue No. 354, dated February 19, 1856.

DIVISION D.

*To all whom it may concern:*

Be it known that I, JOHN H. MANNY, of Rockford, in the county of Winnebago and State of Illinois, late of Freeport, in the county of Stephenson, in the same State, have invented certain new and useful Improvements in Harvesting-Machines, of which the following is a full, clear, and exact description, reference being had to the accompanying drawings, which make part of this specification, and in which—

Figure 1:
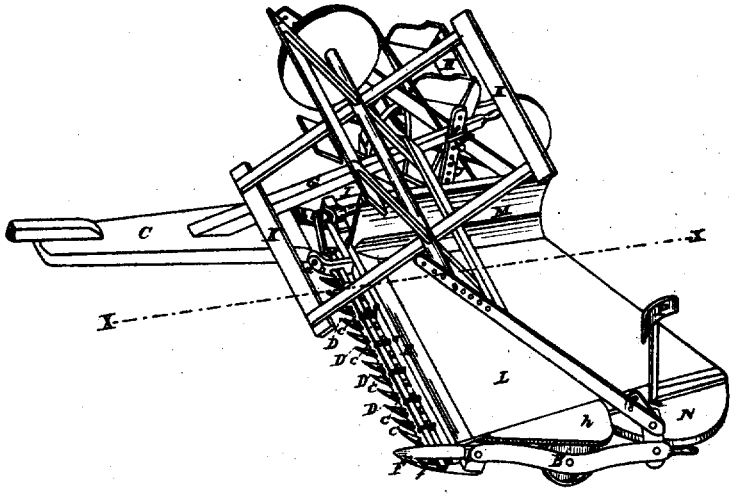
Figure 2:
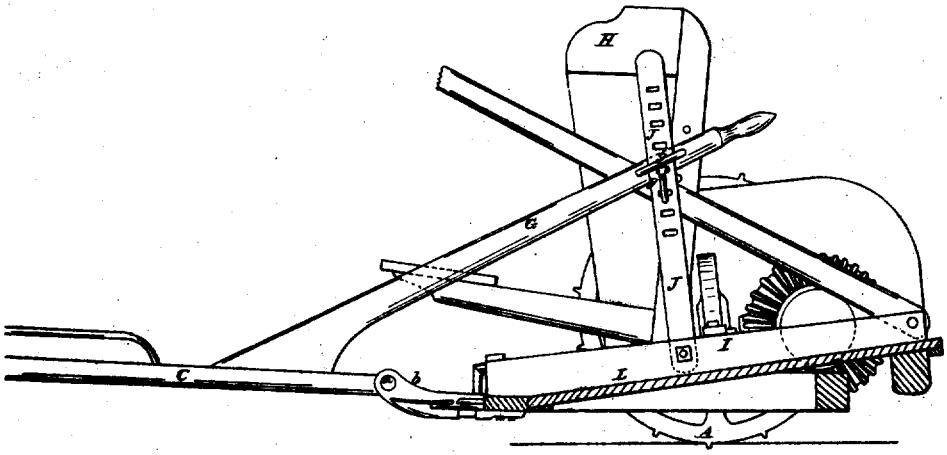

Figure 1 represents a view in perspective of a machine embracing my improvements; and Fig. 2 represents a section at the line *x x* of Fig. 1, with the fence, guard, or wing of the platform removed to exhibit more clearly the arrangement for adjusting the cutters at varying distances from the ground.

In other patents bearing date March 6, 1855, for the term of fourteen years from the 15th day of June, 1854, I have described some of the advantages of my improved divider, my improved arrangement of the raker's or forker's seat or stand, and my improved shield or guard to compress the grain against preparatory to discharging it from the platform; and I need not here repeat these descriptions, my object now being to secure by this patent my improvement in the construction of the tongue and the manner of connecting it with the machine, whereby the adjustment of the cutter at different heights is facilitated and the machine simplified and rendered more compact.

The machine represented in the accompanying drawings is being supported on two wheels, A and B, and provided with driving-gear suitable for giving motion to the cutters and reel; but as the construction and arrangement of the driving-gear and reel are similar to those described in my former patents I deem it unnecessary to describe them particularly here.

The tongue C by which the horses draw the machine is attached to the finger-bar, near its outside or right end by means of a bolt, *a*, passing through it and the ears *b*, thus forming a hinge-joint nearly in a line with the front ends of the fingers, which allows the front of the frame to be elevated or depressed in this line.

On the top of the tongue C is an inclined arm, G, which extends upward and backward within reach of the driver, whose seat H is mounted upon the frame I. The tongue and arm together resemble the letter Y, with one one limb shorter than the other, or a stem with two branches of unequal length. One of these branches forms the arm G, which has a staple, *g*, projecting from its side, through which an upright bar, J, passes, whose lower end is hinged to the frame I. This hinged bar J has a series of holes in it, into any one of which a strong pin, $g^2$, is inserted to limit the descent of the arm G on the bar J. By this arrangement it is obvious that as the front extremity of the tongue is firmly held by the horses, when the arm G is raised or lowered it will raise or lower the rear of the tongue or draft-bar, and impart a corresponding movement to the front edge machine which carries the cutting apparatus, so that the adjustment of the cutter to cut the grain at varying heights is made by raising or lowering the arm G on the bar J, and placing the pin $g^2$ beneath it in the proper hole to hold it from falling below the required elevation. The axles of the supporting-wheels constitute the fulcra upon which the frame turns, while the flexure of the machine to vary the adjustment is at the joint which connects the tongue and finger-bar.

I claim—

In machines for reaping and mowing where the joint by which the tongue or draft-bar is connected to the platform is situate at or near the front of the frame, a draft-bar or tongue constructed with an arm, G, extending backward over the main frame and connected with a suitable device for supporting it at various heights, whereby the cutter can be conveniently adjusted to different heights by an attendant on the main frame, substantially as herein set forth.

In testimony whereof I have hereunto subscribed my name.

JOHN H. MANNY

In presence of—
P. H. WATSON,
A. E. H. JOHNSON.